Sept. 1, 1925.
C. R. SHUMWAY
VEHICLE
Filed Oct. 15, 1923
1,552,353
5 Sheets-Sheet 1
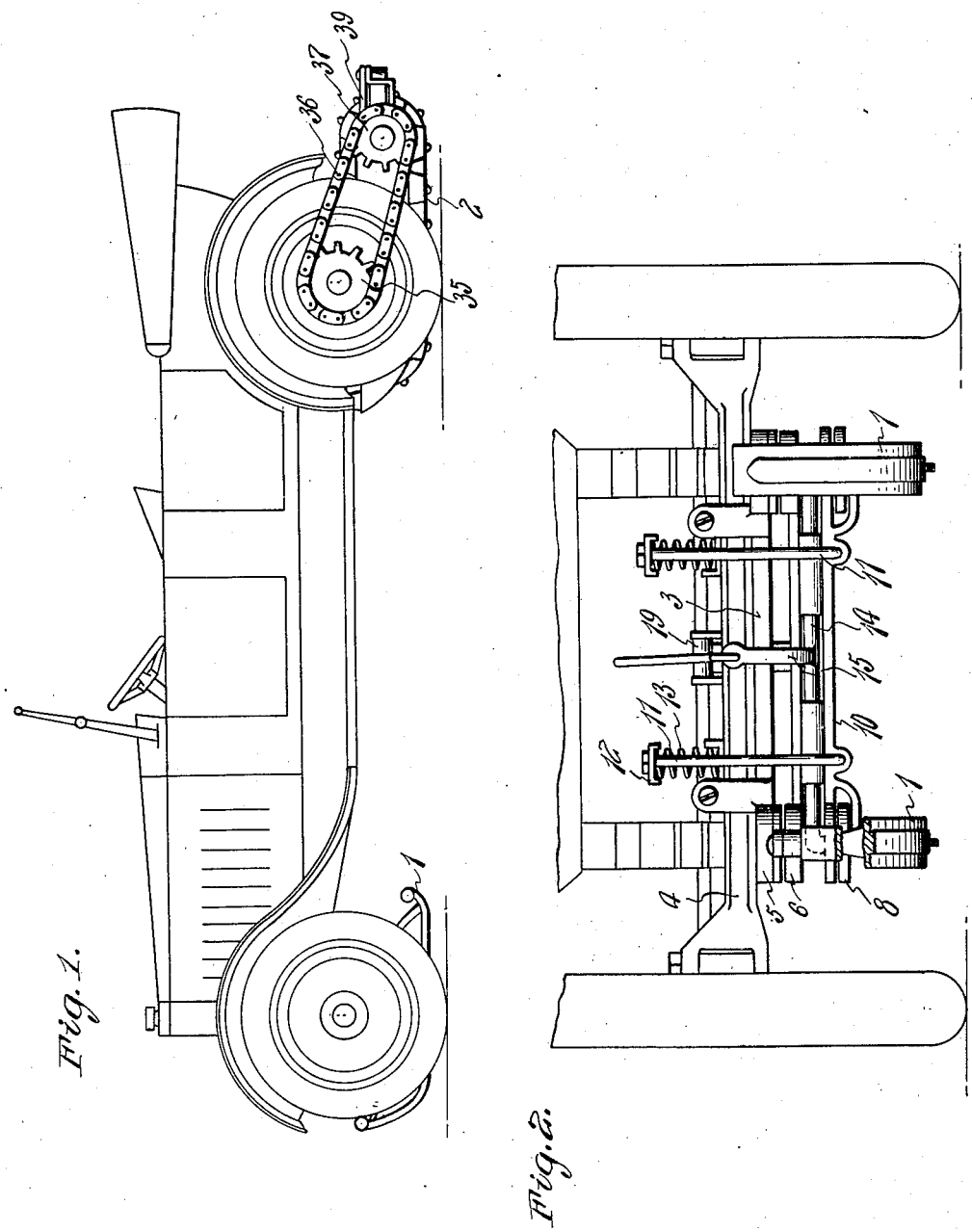
C.R.Shumway
INVENTOR
BY Victor J. Evans
ATTORNEY
WITNESS:

Sept. 1, 1925.
C. R. SHUMWAY
1,552,353
VEHICLE
Filed Oct. 15, 1923    5 Sheets-Sheet 2
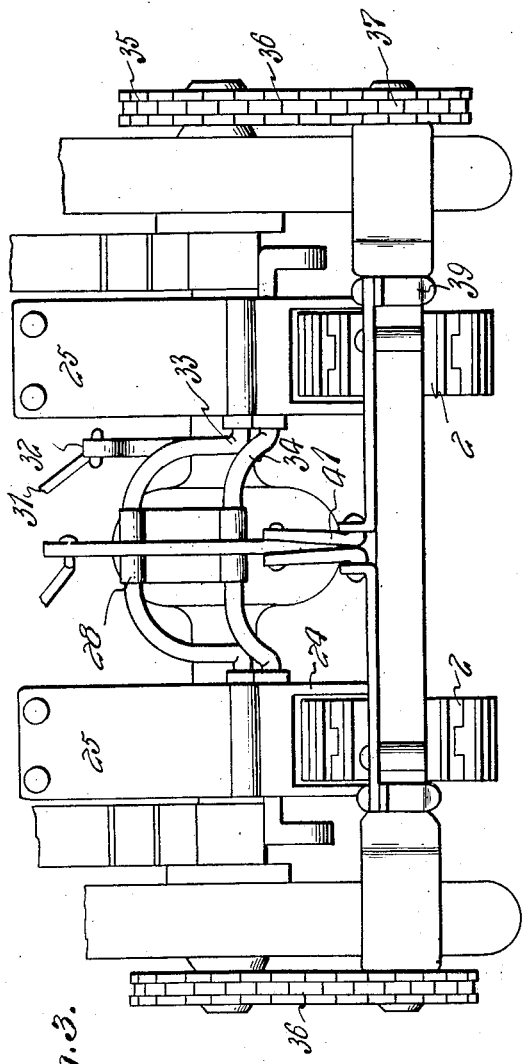
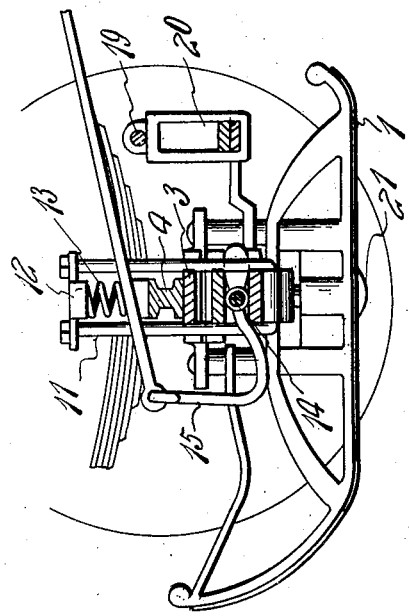
C. R. Shumway
INVENTOR
BY Victor J. Evans
ATTORNEY
WITNESS:

Sept. 1, 1925.
C. R. SHUMWAY
VEHICLE
Filed Oct. 15, 1923
1,552,353
5 Sheets-Sheet 3
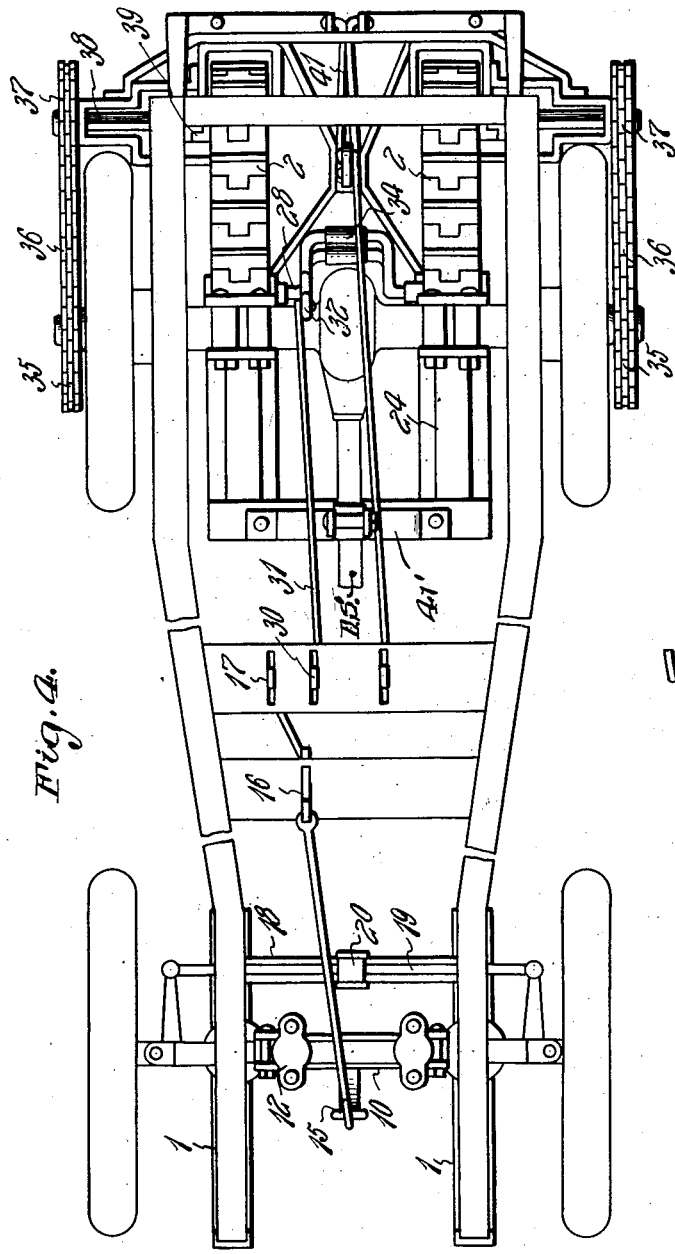
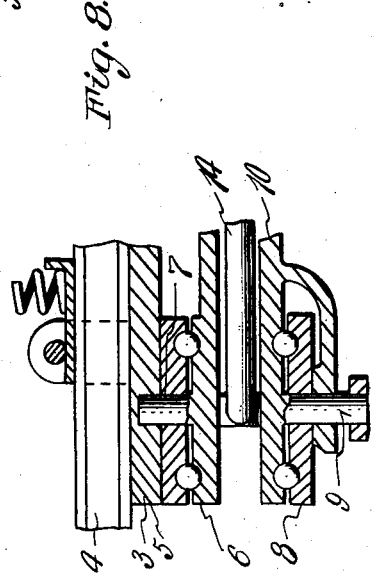
C.R.Shumway
INVENTOR
BY Victor J. Evans
ATTORNEY
WITNESS:

Sept. 1, 1925.
C. R. SHUMWAY
VEHICLE
Filed Oct. 15, 1923
1,552,353
5 Sheets-Sheet 4
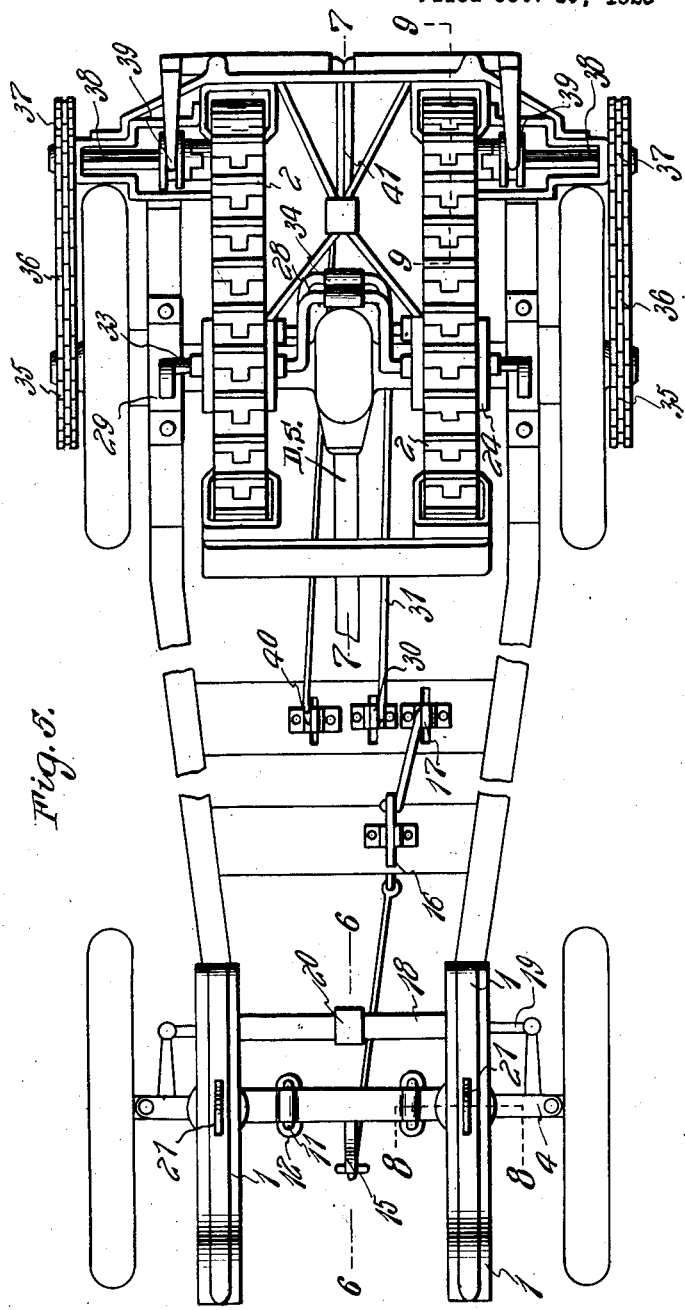
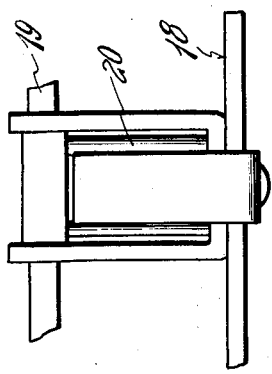
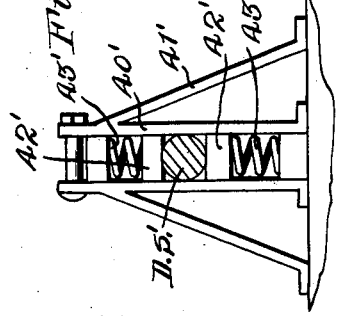
C. R. Shumway
INVENTOR
BY Victor J. Evans
ATTORNEY
WITNESS:

Sept. 1, 1925.                                              1,552,353
                         C. R. SHUMWAY
                            VEHICLE
                      Filed Oct. 15, 1923        5 Sheets-Sheet 5

C. R. Shumway
INVENTOR

BY Victor J. Evans
ATTORNEY

WITNESS:

Patented Sept. 1, 1925.

1,552,353

UNITED STATES PATENT OFFICE.

CYRUS R. SHUMWAY, OF OVID, NEW YORK, ASSIGNOR OF ONE-THIRD TO O. W. BROWN, OF ROMULUS, NEW YORK.

VEHICLE.

Application filed October 15, 1923. Serial No. 668,775.

*To all whom it may concern:*

Be it known that I, CYRUS R. SHUMWAY, a citizen of the United States, residing at Ovid, in the county of Seneca and State of New York, have invented new and useful Improvements in Vehicles, of which the following is a specification.

This invention relates to an attachment for motor vehicles, the general object of the invention being to provide means for permitting the vehicle to travel over snow and ice or sandy or muddy roads by providing the same with runners and endless traction members, with means for driving the said traction members from the rear axle.

Another object of the invention is to provide means whereby the runners and traction members can be lowered into contact with the surface traveled upon which will lift the wheels of the vehicle off the surface.

Another object of the invention is to provide means for causing the runners, which are located at the front of the vehicle, to be turned with the front wheels when the same are operated by the steering mechanism.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of a vehicle supplied with my invention.

Figure 2 is a front view.

Figure 3 is a rear view.

Figure 4 is a plan view with parts broken away.

Figure 5 is a bottom plan view.

Figure 6 is a section on line 6—6 of Figure 5.

Figure 8 is a section on line 8—8 of Figure 5.

Figure 10 is a fragmentary detail view of parts of the invention.

Figure 11 is a fragmentary face view partly in section and partly in elevation.

Figure 7:
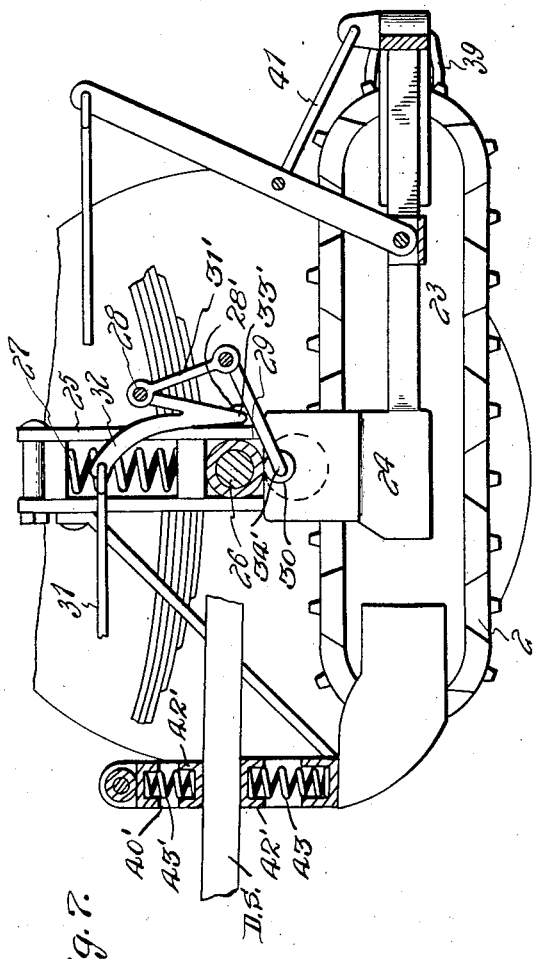
Figure 7 is a section on line 7—7 of Figure 5.
Figure 9:
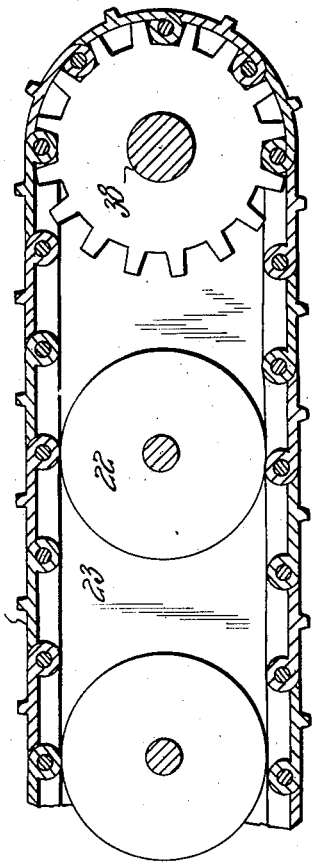
Figure 9 is a section on line 9—9 of Figure 5.

In these views, 1 indicates a pair of runners at the front end of the vehicle and 2 indicates a pair of endless traction members at the rear of the vehicle. A bar 3 is connected with the front axle 4, said bar having disc-shaped ends 5. A similar bar 6 is spaced from the bar 3 and is fastened thereto by means of the pins 7 which pass through the disc-shaped ends of the two bars. Plates 8 are placed between the disc-shaped ends of the two bars and are rotatably mounted upon the pins, each plate carrying a pair of pins 9 and each runner 1 is slidably mounted on a pair of said pins. The runners are connected together by the cross bar 10 which has its forked ends pivotally connected to the runners and this cross bar carries the upwardly extending arms 11, the upper ends of which are connected together by the cross pieces 12 which are engaged by the springs 13, this arrangement of parts tending to hold the runners in their raised position. A rod 14 is rotatably carried by the bar 6 and its cranked ends engage the disc-shaped ends of the cross bar 10 so that when the rod is rotated the runners will be forced downwardly against the action of the springs 13 so as to bring the runners against the road surface and this action will raise the wheels off the said surface. The central part of the rod 14 is provided with a crank 15 which is connected by a link 16 with a hand lever 17, so that the rod 14 can be actuated from a point adjacent the driver's seat. The rear parts of the runner frames are connected together by a cross rod 18 which is connected with the connecting rod 19 of the steering mechanism by the yokes 20 so that the movement of the steering mechanism will be communicated to the runners through said cross bar 18. The runners are provided with discs 21 for preventing side slipping.

The traction members 2 pass over rollers 22 which are journaled in housings 23 which form part of a frame 24. This frame has guideways 25 which engage the rear axle housing 26, springs 27 being arranged in said guideways for holding the frame with the traction members in raised position as to permit the rear wheels to engage the ground A crank shaft 28 is journaled in bearings 28' while a second crank shaft 29 is journaled in bearings 30' formed on the frame 24. A link 31' is pivotally connected with the crank shafts 28 and 29. The crank shaft 28 is formed with a forwardly extending curved arm 32 which is operatively connected with the actuating rod 31. This crank rod is actuated by the hand lever 30, the actuating rod 31, and arm 32 on the crank shaft 33, the crank of which is connected with a crank 34 by the rod 28. Thus the operator can raise and lower the frame which carries the traction members without leaving his seat. A sprocket 35 is connected with each of the rear wheels and a chain 36 connects each sprocket with a sprocket 37 which is mounted on a shaft 38 carried by the frame. The frame 24 carries at its forward end a vertically disposed guide 40' which is braced by brace elements 41'. As shown in Figure 11, the drive shaft D.s.' passes through the guide 40' and is engaged by slidable blocks 42' arranged above and below the drive shaft as shown. Expansible coil springs 43' are accommodated in the guide and resiliently urge the blocks into engagement with the drive shaft and thereby yieldably support the forward end of the frame 24. Clutch means 39 are arranged to connect each shaft 38 with the drive roller of each traction member and these clutch means are actuated, from a point adjacent the driver's seat, by means of the hand lever 40 and the connections 41.

From the foregoing it will be seen that the operator, by actuating levers situated adjacent the driver's seat, can raise and lower the front runners and the rear traction members to bring such runners and members into engagement with the road surface and to remove them out of engagement with the road surface. As the front runners are connected with the steering means they can be turned the same as the wheels for steering the vehicle and the operator can connect the traction members with the rear wheels through means of the clutch means so that the traction members can be driven the same as the rear wheels.

A vehicle equipped with my improvement can be used on snow and ice and on sandy and muddy roads where it would be impossible to use a vehicle equipped with wheels only.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. The combination with a wheeled vehicle, of a frame associated therewith and capable of vertical movement and normally elevated above the ground, rollers journaled in the frame, an endless traction chain engaged with the rollers, means for driving the endless traction chain, a crank shaft journaled in the frame, a second crank shaft journaled in the vehicle at a point above the first mentioned crank shaft, a link connection between the two first shafts and manually operable means for rocking the last mentioned crank shaft whereby movement will be imparted to the other crank shaft to move the frame to a position where the traction chain will engage the ground.

2. The combination with a motor driven vehicle, of a frame arranged beneath the rear axle thereof, a vertically extending guide carried by the forward end of the frame through which the power shaft of the vehicle passes, a floating resiliently held member in the frame and contacting with the power shaft, a slidable connection between the frame at a point intermediate its ends and the rear axle, resilient means engaging the frame and holding it in elevated position, rollers journaled in the frame, a traction chain trained over the rollers, means for operating the traction chain and manually operable means for lowering the frame against the action of the resilient means.

3. An attachment for motor vehicles comprising a frame, a vertically arranged guide through which the axle passes, springs engaging the upper ends of the guides to hold the frame in an elevated position, a second guide carried by the forward end of the frame and adapted to engage the power shaft of the vehicle, spring urged elements in the last mentioned guide, contacting with the power shaft at opposite sides thereof to normally support the forward end of the frame, and manually operable means associated with the frame for moving the same downwardly, and an endless tractor chain supported in the frame and adapted to contact with the ground when the frame is in its lowered position.

In testimony whereof I affix my signature.

CYRUS R. SHUMWAY.